US012464948B2

United States Patent
Li et al.

(10) Patent No.: US 12,464,948 B2
(45) Date of Patent: Nov. 4, 2025

(54) PRESSURE SENSOR BASED ON ZINC OXIDE NANOWIRES AND METHOD OF MANUFACTURING PRESSURE SENSOR

(71) Applicant: INSTITUTE OF MICROELECTRONICS, CHINESE ACADEMY OF SCIENCES, Beijing (CN)

(72) Inventors: Ling Li, Beijing (CN); Xuewen Shi, Beijing (CN); Nianduan Lu, Beijing (CN); Congyan Lu, Beijing (CN); Di Geng, Beijing (CN); Xinlv Duan, Beijing (CN); Ming Liu, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 322 days.

(21) Appl. No.: 18/250,742

(22) PCT Filed: Oct. 26, 2020

(86) PCT No.: PCT/CN2020/123649
§ 371 (c)(1),
(2) Date: Apr. 26, 2023

(87) PCT Pub. No.: WO2022/087782
PCT Pub. Date: May 5, 2022

(65) Prior Publication Data
US 2023/0371384 A1 Nov. 16, 2023

(51) Int. Cl.
*H10N 30/074* (2023.01)
*B82Y 40/00* (2011.01)
(Continued)

(52) U.S. Cl.
CPC ............ *H10N 30/074* (2023.02); *B82Y 40/00* (2013.01); *G01L 1/16* (2013.01); *H10D 30/67* (2025.01); *H10N 30/067* (2023.02); *H10N 39/00* (2023.02)

(58) Field of Classification Search
CPC .. H10N 30/074; H10N 30/067; H10N 30/302; H10N 30/071; H10N 39/00; H10D 30/67; B82Y 40/00
See application file for complete search history.

(56) References Cited

U.S. PATENT DOCUMENTS

2007/0154385 A1* 7/2007 Min .................. C01G 9/02
423/622
2010/0050745 A1* 3/2010 Liu .................... G01N 27/4141
73/31.06
(Continued)

FOREIGN PATENT DOCUMENTS

CN 103236443 A 8/2013
CN 103681962 A 3/2014
(Continued)

OTHER PUBLICATIONS

Translation of CN111060233.*
International Search Report and Written Opinion dated Apr. 27, 2021, for corresponding PCT Application No. PCT/CN2020/123649.

*Primary Examiner* — Helen C Kwok
(74) *Attorney, Agent, or Firm* — Kinney & Lange, P.A.

(57) ABSTRACT

A pressure sensor based on zinc oxide nanowires and a method of manufacturing a pressure sensor based on zinc oxide nanowires are provided. The manufacturing method includes: manufacturing a bottom electrode on a substrate; manufacturing a seed layer on the bottom electrode; manufacturing a zinc oxide nanowire layer on the seed layer; manufacturing a support layer on the zinc oxide nanowire (Continued)

layer; and manufacturing a top electrode on the support layer.

13 Claims, 5 Drawing Sheets

(51) Int. Cl.
*G01L 1/16* (2006.01)
*H10D 30/67* (2025.01)
*H10N 30/067* (2023.01)
*H10N 39/00* (2023.01)

(56) References Cited

U.S. PATENT DOCUMENTS

2017/0045406 A1\* 2/2017 Jang ................. G06N 3/008
2018/0266899 A1 9/2018 Jang et al.

FOREIGN PATENT DOCUMENTS

| CN | 105552114 A | 5/2016 |
| CN | 105718116 A | 6/2016 |
| CN | 109411539 A | 3/2019 |
| CN | 111060233 A | 4/2020 |

\* cited by examiner

US 12,464,948 B2

PRESSURE SENSOR BASED ON ZINC OXIDE NANOWIRES AND METHOD OF MANUFACTURING PRESSURE SENSOR

CROSS-REFERENCE TO RELATED APPLICATION

This application is a Section 371 National Stage Application of International Application No. PCT/CN2020/123649, filed on Oct. 26, 2020, entitled "PRESSURE SENSOR BASED ON ZINC OXIDE NANOWIRES AND METHOD OF MANUFACTURING PRESSURE SENSOR", the content of which is hereby incorporated by reference in its entirety.

TECHNICAL FIELD

The present disclosure relates to fields of a metal oxide transistor and a pressure sensor, and in particular, to a pressure sensor based on zinc oxide nanowires and a method of manufacturing a pressure sensor based on zinc oxide nanowires.

BACKGROUND

An amorphous indium gallium zinc oxide thin film transistor (a-IGZO-TFT) has been widely concerned by researchers since its inception. Due to characteristics such as a high mobility, an ultra-low off-state leakage current, a large band gap width and a compatibility between a manufacturing process and an existing thin film transistor technology, etc., the a-IGZO-TFT may have a strong competitiveness in a low-power application, a high-resolution and high-refresh display panel and a transparent display.

In a future era of the Internet of Things, an acquisition and a transmission of a signal has become the top priority. A pressure detection becomes a basis for an application of a flexible electronic skin, a high sensitivity mechanical arm and other technologies. For a pressure sensing array, a pixel cell may be usually controlled by using a thin film transistor as a selector device. As a representative of a new thin-film transistor technology, the a-IGZO-TFT has characteristics of a high mobility, an ultra-low leakage current and a high uniformity during a large-area preparation, which may perfectly fit a selection standard of the selector device. In recent years, a pressure sensor based on the a-IGZO-TFT has also developed rapidly. In addition, although a display panel based on the a-IGZO-TFT has been commercialized, how to integrate more functions into a conventional panel for a display purpose to achieve a new interactive experience has become an important technical guide for a future change in a display industry. At present, people have explored an integrated technology of the pressure sensor.

At present, a material used to implement a pressure sensing is mainly a piezoelectric material. A ceramic material with a very high piezoelectric coefficient becomes the best choice for a pressure conversion. However, due to harsh conditions such as a high temperature, a high pressure, etc. required for a completion of polarization, an application of the material in a low temperature preparation process of a TFT (thin film transistor) display panel, etc. may be limited; another piezoelectric material that has been often studied is a polyvinylidene fluoride film (PVDF), which has a same problem of implementing a relatively high sensitivity and piezoelectric coefficient, a high temperature and a high electric field are required when the material is manufactured, which may also limit an application of the material in the TFT.

SUMMARY

In view of the above-mentioned technical problems, the present disclosure provides a pressure sensor based on zinc oxide nanowires and a method of manufacturing a pressure sensor based on zinc oxide nanowires.

One of main objectives of the present disclosure is to provide a method of manufacturing a pressure sensor based on zinc oxide nanowires, including:
manufacturing a bottom electrode on a substrate;
manufacturing a seed layer on the bottom electrode;
manufacturing a zinc oxide nanowire layer on the seed layer;
manufacturing a support layer on the zinc oxide nanowire layer; and
manufacturing a top electrode on the support layer.

In another aspect of the present disclosure, a pressure sensor obtained by the above-mentioned manufacturing method is further provided.

DESCRIPTION OF SYMBOLS

101—substrate; 1021—first metal gate; 1022—second metal gate; 103—dielectric layer; 1031—via hole; 104—active layer; 105—source electrode; 106—drain electrode; 107—passivation layer; 108—groove;
201—bottom electrode; 202—seed layer; 203—zinc oxide nanowire layer; 204—support layer; 205—top electrode; 206—protective layer.

DETAILED DESCRIPTION OF EMBODIMENTS

The present disclosure will be described below in detail with reference to accompanying drawings and embodiments to assist those skilled in the art to fully understand the objectives, features, and effects of the present disclosure. The accompanying drawings show exemplary embodiments of the present disclosure. However, it should be understood that the present application may be implemented in other forms and should not be limited by the embodiments described herein. In addition, in the following descriptions, descriptions of the well-known structures and technologies are omitted to avoid unnecessarily obscuring the concept of the present disclosure. In addition, various embodiments and the technical features in the embodiments provided below in the present disclosure may be combined with each other in any manner.

Terms used herein are only intended to describe specific embodiments and are not intended to limit the present disclosure. Terms "include", "comprise", "contain", etc. used herein indicate the presence of the described features, steps, operations and/or components, but do not exclude the presence or addition of one or more other features, steps, operations and/or components. All terms (including technical and scientific terms) used herein have meanings generally understood by those skilled in the art, unless otherwise defined. It should be noted that the terms used herein should be interpreted as having the meaning consistent with the context of the present disclosure, and should not be interpreted in an idealized or overly rigid manner.

The present disclosure provides a design and a method of manufacturing a pressure sensor based on a-IGZO-TFT and ZnO NWs. ZnO NWs are manufactured on an a-IGZO-TFT backplate by using the a-IGZO-TFT as a selector device of a pixel cell in an array and as a pressure sensing cell by combining with ZnO NWs, so as to complete the pressure detection and implement a pressure sensing technology at a low temperature. The technology is of great significance to the implementation of a pressure integration solution in a flexible electronic skin, a highly sensitive mechanical arm and a display panel.

Figure 1:
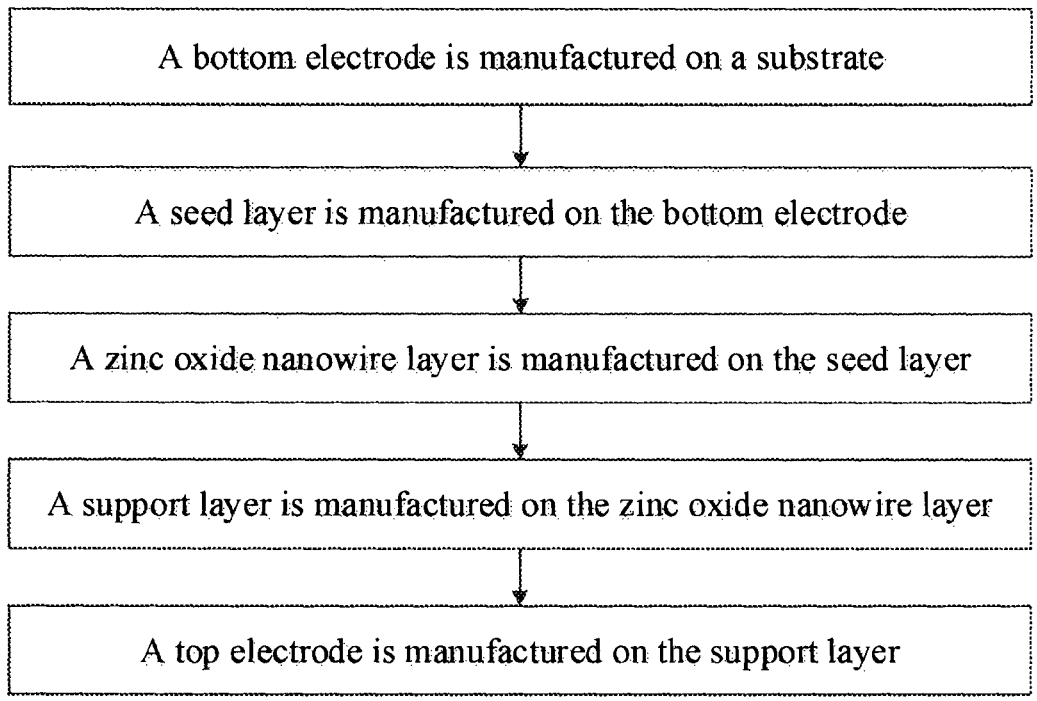
FIG. 1 shows a flowchart of a method of manufacturing a pressure sensor based on zinc oxide nanowires according to embodiments of the present disclosure.

As shown in FIG. 1, the present disclosure provides a method of manufacturing a pressure sensor, including:
  manufacturing a bottom electrode on a substrate;
  manufacturing a seed layer on the bottom electrode;
  manufacturing a zinc oxide nanowire layer on the seed layer;
  manufacturing a support layer on the zinc oxide nanowire layer; and
  manufacturing a top electrode on the support layer.

In some embodiments of the present disclosure, a temperature at which the zinc oxide nanowire layer is manufactured is in a range of 70° C. to 100° C., such as 70° C., 80° C., 90° C. and 100° C.

In some embodiments of the present disclosure, the manufacturing method further includes manufacturing a protective layer on the top electrode.

In some embodiments of the present disclosure, a material of the seed layer is ZnO, and the seed layer has a thickness of 5 nm to 10 nm.

In some embodiments of the present disclosure, the zinc oxide nanowire layer has a thickness of 100 nm to 200 nm.

In some embodiments of the present disclosure, a material of the bottom electrode includes Mo or Au, and the bottom electrode has a thickness of 50 nm to 200 nm.

In some embodiments of the present disclosure, a material of the support layer includes an SU-8 photoresist.

In some embodiments of the present disclosure, a material of the top electrode includes Ti/Au; and the top electrode has a thickness of 100 nm to 500 nm.

In some embodiments of the present disclosure, a method of manufacturing the bottom electrode comprises a magnetron sputtering method.

In some embodiments of the present disclosure, a method of manufacturing the seed layer comprises a magnetron sputtering method.

In some embodiments of the present disclosure, a method of manufacturing the support layer comprises a spin-coating method.

In some embodiments of the present disclosure, a method of manufacturing the top electrode comprises an electron beam evaporation method.

In some embodiments of the present disclosure, the substrate includes a backplate of a thin film transistor.

In some embodiments of the present disclosure, a method of manufacturing the thin film transistor includes:
  manufacturing a metal gate on the substrate;
  manufacturing a dielectric layer on the metal gate;
  manufacturing an active layer on the dielectric layer;
  manufacturing an electrode layer on the active layer; and
  manufacturing a passivation layer on the electrode layer.

In some embodiments of the present disclosure, a material of the substrate includes glass or a silicon oxide, and the substrate has a thickness of 300 μm to 500 μm.

In some embodiments of the present disclosure, a material of the metal gate includes Mo or Au, and the metal gate has a thickness of 20 nm to 40 nm.

In some embodiments of the present disclosure, a material of the dielectric layer includes a silicon oxide or an aluminum oxide, and the dielectric layer has a thickness of 200 nm to 300 nm.

In some embodiments of the present disclosure, a material of the active layer includes IGZO or an organic semiconductor, and the active layer has a thickness of 20 nm to 30 nm.

In some embodiments of the present disclosure, a material of the electrode layer includes Mo or Ti/Au, and the electrode layer has a thickness of 50 nm to 100 nm.

In some embodiments of the present disclosure, a material of the passivation layer includes a silicon oxide or an aluminum oxide, and the passivation layer has a thickness of 200 nm to 300 nm.

In some embodiments of the present disclosure, the electrode layer is arranged on the active layer and located above the metal gate.

In some embodiments of the present disclosure, the metal gate includes a first metal gate and a second metal gate.

In some embodiments of the present disclosure, the active layer is arranged on the dielectric layer and located above the second metal gate.

The present disclosure further provides a pressure sensor obtained by the manufacturing method as described above.

The technical solution of the present disclosure will be further described below with reference to specific embodiments and the accompanying drawings. It should be noted that the following specific embodiments are only described as an example, but the scope of protection of the present disclosure is not limited to this.

Figure 2:
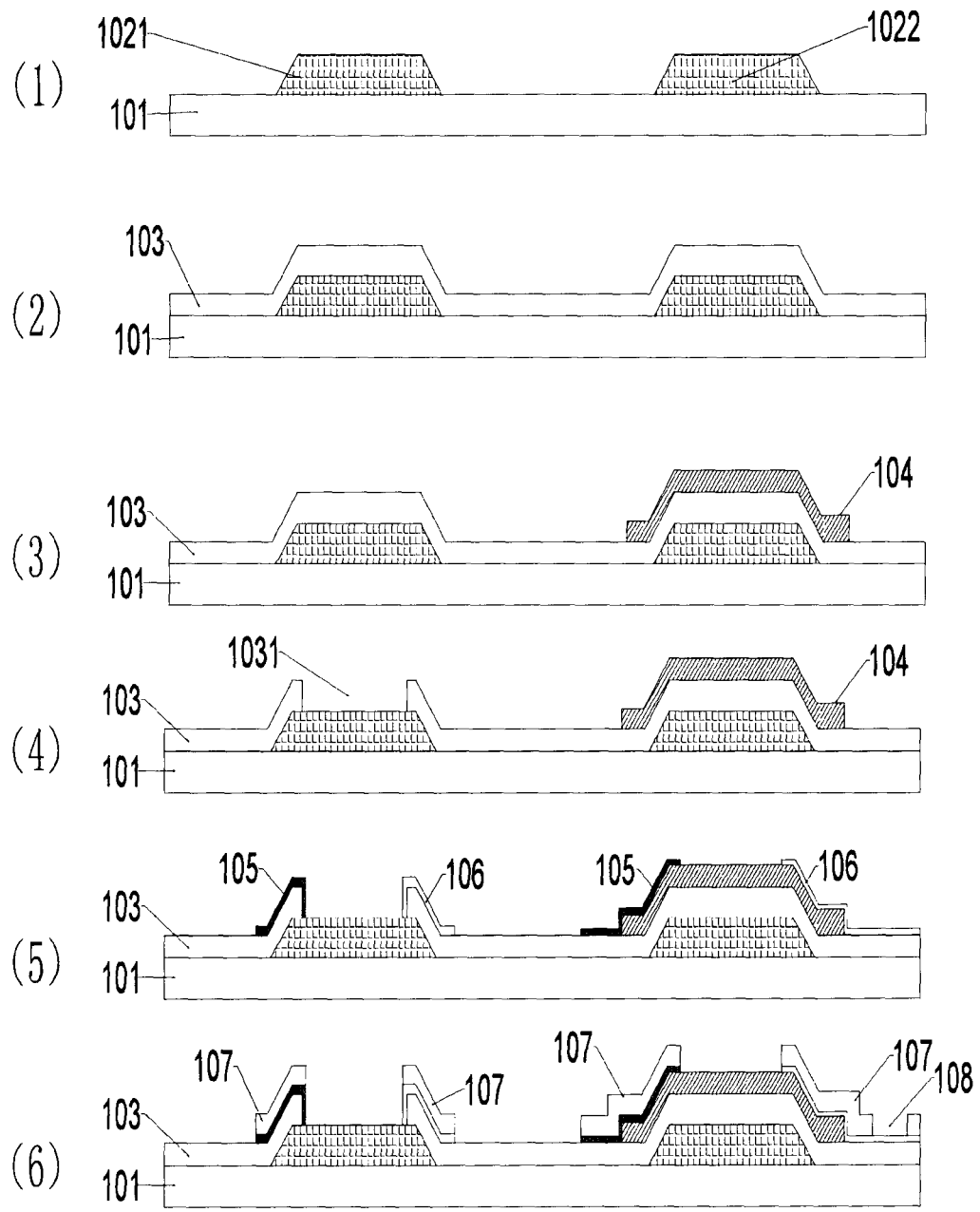
FIG. 2 shows a schematic diagram of a process of manufacturing an a-IGZO-TFT backplate according to embodiments of the present disclosure.

As shown in FIG. 2, the embodiments provide a thin film transistor, including:
  an insulating layer substrate 101;
  a metal gate including a first metal gate 1021 and a second metal gate 1022, wherein the metal gate is arranged on the insulating layer substrate 101;
  a dielectric layer 103 arranged on the metal gate;
  an active layer 104 arranged on the dielectric layer 103 and located above the second metal gate;
  an electrode layer including a source electrode 105 and a drain electrode 106, wherein the electrode layer is arranged above the first metal gate and the second metal gate; and
  a passivation layer 107 arranged on the electrode layer;
  wherein the insulating layer substrate 101 is glass or a silicon oxide substrate, and has a thickness of 300 μm to 500 μm.

The metal gate is a metal Mo, Au, etc., and has a thickness of 20 nm to 40 nm.

The dielectric layer 103 is a silicon oxide or an aluminum oxide, and has a thickness of 200 nm to 300 nm.

The active layer 104 is an IGZO (indium gallium zinc oxide), an organic semiconductor, etc., and has a thickness of 20 nm to 30 nm.

The source electrode 105 and the drain electrode 106 are Mo or Ti/Au, etc., and have a thickness of 50 nm to 100 nm.

The passivation layer 107 is a silicon oxide or an aluminum oxide, and has a thickness of 200 nm to 300 nm.

As shown in FIG. 2, a method of manufacturing a thin film transistor device specifically includes step 1 to step 6.

Step 1: Mo or Au with a certain thickness is grown on the insulating layer substrate 101 by an electron beam evaporation as a metal gate, as shown in FIG. 2(1).

Step 2: The gate dielectric layer 103 is manufactured on the device formed in step 1 by using a process of plasma vapor chemical deposition (PECVD) or atomic layer deposition (ALD), as shown in FIG. 2(2).

Step 3: IGZO is grown as the active layer 104 by using magnetron sputtering, or an organic semiconductor is manufactured as the active layer 104 by using an organic vapor deposition (OPVD), as shown in FIG. 2(3). After a deposition of a-IGZO, a graphic processing is performed on the a-IGZO by a process of photolithography and wet etching.

Step 4: The gate dielectric layer 103 is etched to form a via hole 1031; the specific steps include: first removing $SiO_2$ from the gate dielectric layer with an etching solution, and then etching $Al_2O_3$ with a phosphoric acid to form the via hole 1031, as shown in FIG. 2(4).

Step 5: Mo or Ti/Au with a certain thickness is grown near the via hole 1031 and on active layer 104 as the source electrode 105 and the drain electrode 106 by using the electron beam evaporation, as shown in FIG. 2(5).

Step 6: A layer of silicon oxide or aluminum oxide is deposited on the source electrode 105 and the drain electrode 106 as the passivation layer 107 by using PECVD or ALD, so as to obtain the a-IGZO-TFT, as shown in FIG. 2(6).

Figure 3:
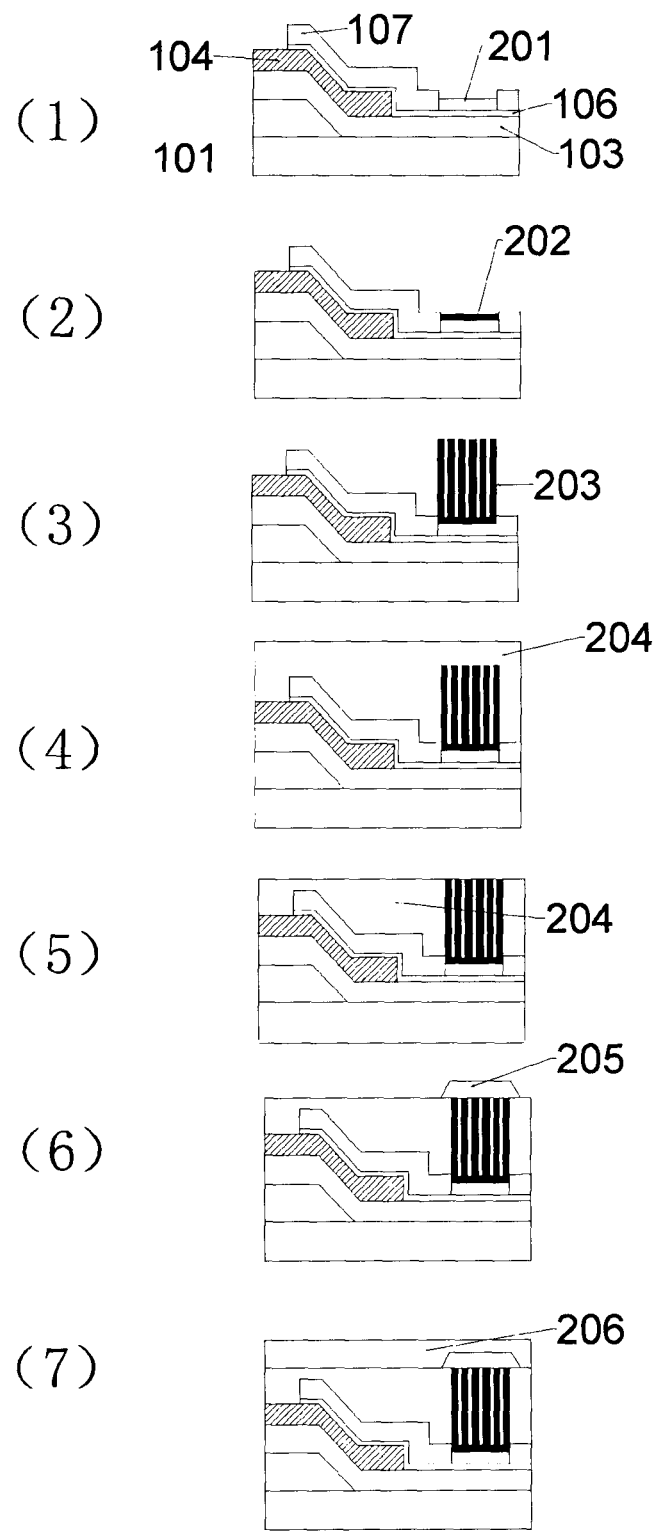
FIG. 3 shows a schematic diagram of a process of manufacturing a pressure sensor based on zinc oxide nanowires (ZnO NWs) according to embodiments of the present disclosure.

The embodiments further provide a method of manufacturing a pressure sensor based on zinc oxide nanowires. As shown in FIG. 3 (for the convenience of presentation, FIG. 3 shows only a local structure), the process of manufacturing the pressure sensor based on zinc oxide nanowires includes step 1 to step 6:

Step 1: A layer of Au of 100 nm to 200 nm is grown on a groove 108 of a completed a-IGZO-TFT backplate by magnetron sputtering as a bottom electrode 201 for ZnO NWs, as shown in FIG. 3(1).

Step 2: A layer of a ZnO film of 5 nm to 10 nm is grown on the bottom electrode 201 by magnetron sputtering as a seed layer 202, as shown in FIG. 3(2).

Step 3: A sample is placed in a growth solution of ZnO NWs to grow the ZnO NWs at a temperature of about 70° C. to 100° C., so as to synthesize a zinc oxide nanowire layer 203, as shown in FIG. 3(3).

Step 4: An SU-8 photoresist is used as a material of a support layer 204, and to be spin coated around the grown ZnO NWs and baked in air at a temperature of 240° C. to 260° C. for 25 min to 50 min, so as to complete a curing of the SU-8 photoresist, as shown in FIG. 3(4).

Step 5: An excess SU-8 photoresist is removed using an ICP etching technology, so as to expose the zinc oxide nanowire layer 203, as shown in FIG. 3(5).

Step 6: A layer of Ti/Au of 100 nm to 500 nm is evaporated as a top electrode 205 for the ZnO NWs by an electron beam evaporation method, as shown in FIG. 3(6).

Step 7: A layer of SU-8 photoresist is manufactured on the top electrode as a protective layer 206 by using a spin-coating method, as shown in FIG. 3(7).

Figure 4:
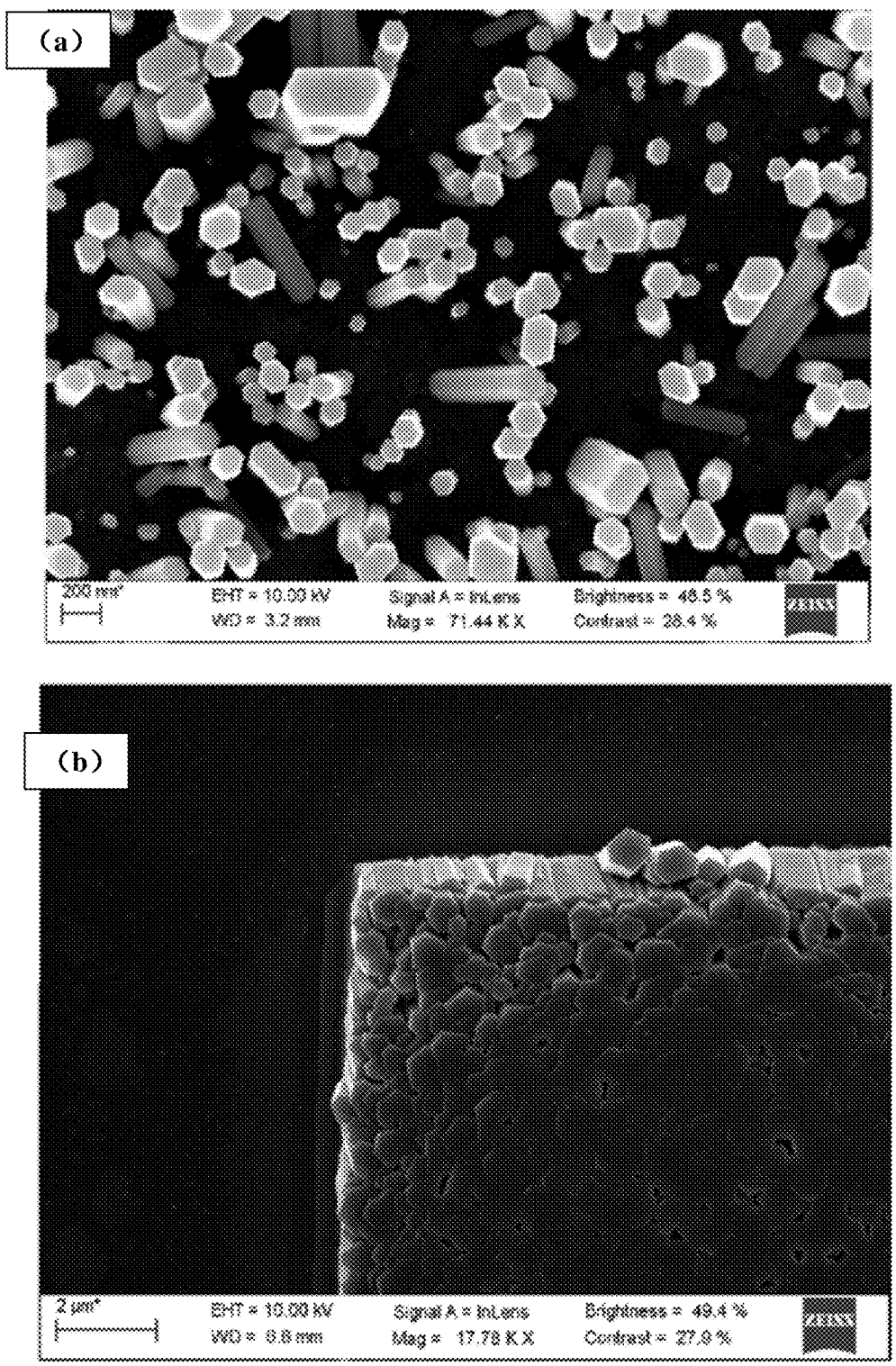
FIG. 4 shows an SEM diagram of ZnO NWs manufactured according to embodiments of the present disclosure.

FIG. 4 shows an SEM diagram of a pressure sensor based on zinc oxide nanowires manufactured by the above-mentioned method, in which (a) is an SEM diagram of the manufactured ZnO NWs at 200 nm, and (b) is an SEM diagram of the manufactured ZnO NWs at 2 μm. As shown in FIG. 4, the manufactured ZnO NWs is a regular hexagon with a cross-section diameter of about 150 nm; and the ZnO NWs have a very dense stacked structure at a position of the seed layer, which may show that the method used in the present disclosure may well manufacture ZnO NWs for a pressure sensing.

Figure 5:
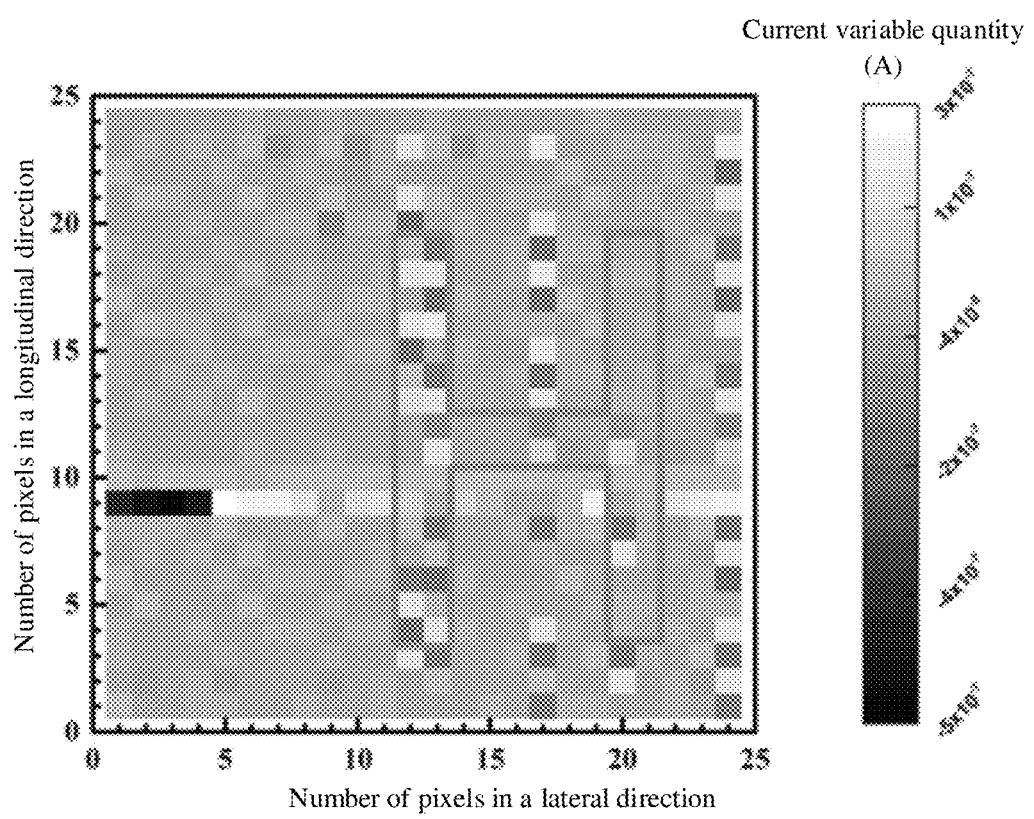
FIG. 5 shows a test result diagram of a pressure sensor based on zinc oxide nanowires according to embodiments of the present disclosure.

A pressure test is performed on the pressure sensor based on the zinc oxide nanowires manufactured by the above-mentioned method, and a result thereof is shown in FIG. 5. Because the a-IGZO-TFT is connected to the ZnO NWs by Au, when Au is in contact with ZnO, a potential barrier of about 0.65 eV may be formed. During the test, a compressive stress is applied in a positive direction of a c-axis, and the compressive stress may change a potential barrier between the ZnO NWs and the metal in contact. The potential barrier increases after the pressure is applied, so an equivalent resistance of the ZnO NWs increases and a current flowing through ZnO decreases. A current flowing through ZnO is recorded as I0 when no pressure is applied, and a current flowing through ZnO is recorded as I1 when the pressure is applied, $\Delta I = I1 - I0$ indicates an increment of the current when the pressure is applied. During the test, a stainless steel metal mold with a shape of "H" is placed on a sample, and then the current flowing through ZnO is measured with a source meter while applying the pressure on the mold. During a matrix scanning, a control TFT in each pixel works in a saturation region, VGS (a gate voltage relative to a source electrode)=VDS (a source drain voltage) =4 V. Before the pressure test, initial currents I0 of all pixels are first recorded, and then the current I1 flowing through ZnO is recorded when different pressures are applied on the mold. According to a current increment, a drawing result is shown in a pressure sensor array image shown in FIG. 5. FIG. 5 shows an image when an applied pressure is 120 N. It can be seen from the figure that after the pressure of 120 N is applied, a character "H" is clearly displayed in the pressure sensor, which may indicate that the pressure sensor manufactured may successfully implement a characteristic of pressure sensing.

To sum up, the pressure sensor based on zinc oxide nanowires and the method of manufacturing the pressure sensor based on zinc oxide nanowires provided in the present disclosure have at least one of following advantages relative to an existing technology:

1. A pressure sensor based on a-IGZO-TFT and ZnO NWs manufactured in the present disclosure may implement a pressure detection.

2. A pressure sensor made of a conventional piezoelectric material such as a ceramic material is generally manufactured at a temperature of above 1000 K, while the present disclosure may implement a technology of manufacturing the pressure sensor at a low temperature (70° C. to 100° C.).

3. A conventional material (e.g., a polymer material) may implement the characteristic of the pressure sensing only at a high polarization electric field (600 V), while the present disclosure may implement the characteristic of the pressure sensing of the pressure sensor under a low voltage (3 V to 5 V) operation.

4. Due to use of an IGZO semiconductor material as a thin film transistor, which has characteristics of flexibility, bendability, etc., the present disclosure provides a set of technical solutions for a pressure integration in an electronic skin, an intelligent manipulator and a display panel.

It should be noted that although the present disclosure has been illustrated and described with reference to specific exemplary embodiments of the present disclosure, those skilled in the art should understand that the present disclosure is not limited to the above-mentioned embodiments. Without departing from the spirit and scope of the present disclosure, if various changes or modifications to the present disclosure fall within the scope of the claims and equivalent technologies of the present disclosure, it means that these changes and modifications should be included in the present disclosure.

In particular, without departing from the spirit and principles of the present disclosure, various combinations and/or incorporations of the features recited in various embodiments and/or claims of the present disclosure may be made, even if such combinations or incorporations are not explicitly recited in the present disclosure. All of the combinations and/or incorporations fall within the scope of the present disclosure. Therefore, the scope of the present disclosure is determined not only by the appended claims, but also by the equivalents of the appended claims.

What is claimed is:

1. A method of manufacturing a pressure sensor, comprising:
   manufacturing a bottom electrode on a substrate;
   manufacturing a seed layer on the bottom electrode;
   manufacturing a zinc oxide nanowire layer on the seed layer, wherein the zinc oxide nanowire layer is manufactured by: placing a sample of a ZnO film grown on the bottom electrode in a growth solution of ZnO nanowires to grow the ZnO nanowires at a temperature of 70° C. to 100° C., so as to synthesize the zinc oxide nanowire layer; wherein the zinc oxide nanowire layer has a thickness of 100 nm to 200 nm, the zinc oxide nanowire layer is a regular hexagon with a cross-section diameter of 150 nm, and the zinc oxide nanowire layer has a dense stacked structure; and wherein when the bottom electrode is in contact with the zinc oxide nanowire layer, a potential barrier of 0.65 eV is formed, so as to implement a characteristic of a pressure sensing of the pressure sensor under a voltage of 3 V to 5 V;
   manufacturing a support layer on the zinc oxide nanowire layer; and
   manufacturing a top electrode on the support layer.

2. The method according to claim 1, further comprising: manufacturing a protective layer on the top electrode.

3. The method according to claim 1, wherein,
   a material of the seed layer is ZnO, and the seed layer has a thickness of 5 nm to 10 nm.

4. The method according to claim 1, wherein,
   a material of the bottom electrode comprises Mo or Au, and the bottom electrode has a thickness of 50 nm to 200 nm.

5. The method according to claim 1, wherein,
   a material of the support layer comprises an SU-8 photoresist.

6. The method according to claim 1, wherein,
   a material of the top electrode comprises Ti/Au; and the top electrode has a thickness of 100 nm to 500 nm.

7. The method according to claim 1, wherein,
   a method of manufacturing the bottom electrode comprises a magnetron sputtering method;
   a method of manufacturing the seed layer comprises a magnetron sputtering method;
   a method of manufacturing the support layer comprises a spin-coating method; and
   a method of manufacturing the top electrode comprises an electron beam evaporation method.

8. The method according to claim 1, wherein,
   the substrate comprises a backplate of a thin film transistor.

9. The method according to claim 8, wherein,
   a method of manufacturing the thin film transistor comprises:
   manufacturing a metal gate on the substrate;
   manufacturing a dielectric layer on the metal gate;
   manufacturing an active layer on the dielectric layer;
   manufacturing an electrode layer on the active layer; and
   manufacturing a passivation layer on the electrode layer.

10. The method according to claim 9, wherein
    a material of the substrate comprises a glass or a silicon oxide, and the substrate has a thickness of 300 μm to 500 μm; and
    a material of the metal gate comprises Mo or Au, and the metal gate has a thickness of 20 nm to 40 nm.

11. The method according to claim 9, wherein,
    a material of the dielectric layer comprises a silicon oxide or an aluminum oxide, and the dielectric layer has a thickness of 200 nm to 300 nm;
    a material of the active layer comprises IGZO or an organic semiconductor, and the active layer has a thickness of 20 nm to 30 nm;
    a material of the electrode layer comprises Mo or Ti/Au, and the electrode layer has a thickness of 50 nm to 100 nm; and
    a material of the passivation layer comprises a silicon oxide or an aluminum oxide, and the passivation layer has a thickness of 200 nm to 300 nm.

12. The method according to claim 9, wherein,
    the electrode layer is arranged on the active layer and located above the metal gate;
    the metal gate comprises a first metal gate and a second metal gate; and
    the active layer is arranged on the dielectric layer and located above the second metal gate.

13. A pressure sensor obtained by the method according to claim 1.

* * * * *